United States Patent
Goudie (10) Patent No.: US 12,190,145 B2
(45) Date of Patent: Jan. 7, 2025

(54) MEMORY ALLOCATION IN A RAY TRACING SYSTEM

(71) Applicant: Imagination Technologies Limited, Kings Langley (GB)

(72) Inventor: Alistair Goudie, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 321 days.

(21) Appl. No.: 17/484,947

(22) Filed: Sep. 24, 2021

(65) Prior Publication Data

US 2022/0114013 A1   Apr. 14, 2022

(30) Foreign Application Priority Data

Sep. 24, 2020   (GB) ..................... 2015138

(51) Int. Cl.
G06F 9/48 (2006.01)
G06F 9/50 (2006.01)
G06T 15/06 (2011.01)

(52) U.S. Cl.
CPC ............ G06F 9/485 (2013.01); G06F 9/5016 (2013.01); G06T 15/06 (2013.01)

(58) Field of Classification Search
CPC ..................................................... G06F 9/485
See application file for complete search history.

(56) References Cited

U.S. PATENT DOCUMENTS

| | | | |
|---|---|---|---|
| 2010/0141664 A1* | 6/2010 | Rawson | G06T 1/20 345/502 |
| 2013/0155080 A1 | 6/2013 | Nordlund et al. | |
| 2017/0060441 A1* | 3/2017 | Wang | G06F 13/1668 |
| 2019/0278355 A1* | 9/2019 | Faasse | G06F 1/3296 |

FOREIGN PATENT DOCUMENTS

| | | |
|---|---|---|
| EP | 3244304 A1 | 11/2017 |
| EP | 3457280 A1 | 3/2019 |
| EP | 3608879 A1 | 2/2020 |
| GB | 2555929 A | 5/2018 |
| WO | 2018/118367 A1 | 6/2018 |

OTHER PUBLICATIONS

Admin AfterAcademy, What is Context Switching in Operating System?, 2019 (Year: 2019).*
Pitchaya et al, "An Improved Shading Cache for Modern GPUs," The Eurographics Association, 2008, pp. 95-101.

* cited by examiner

Primary Examiner — Charlie Sun
(74) Attorney, Agent, or Firm — Potomac Law Group, PLLC; Vincent M DeLuca (57) ABSTRACT

A method of processing rays in a ray tracing system, the method comprising: allocating a block of memory for a task on a per-task basis; processing rays in the task causing at least one child ray to be emitted; writing intermediate data for the task to said block of memory; suspending processing of the task; and when the task is ready to resume, reading intermediate data for the task from the block of memory, and resuming the processing of the task.

19 Claims, 4 Drawing Sheets

MEMORY ALLOCATION IN A RAY TRACING SYSTEM

FIELD

The present disclosure is directed to allocating memory for recursive processing in a ray tracing system.

BACKGROUND

Figure 1:
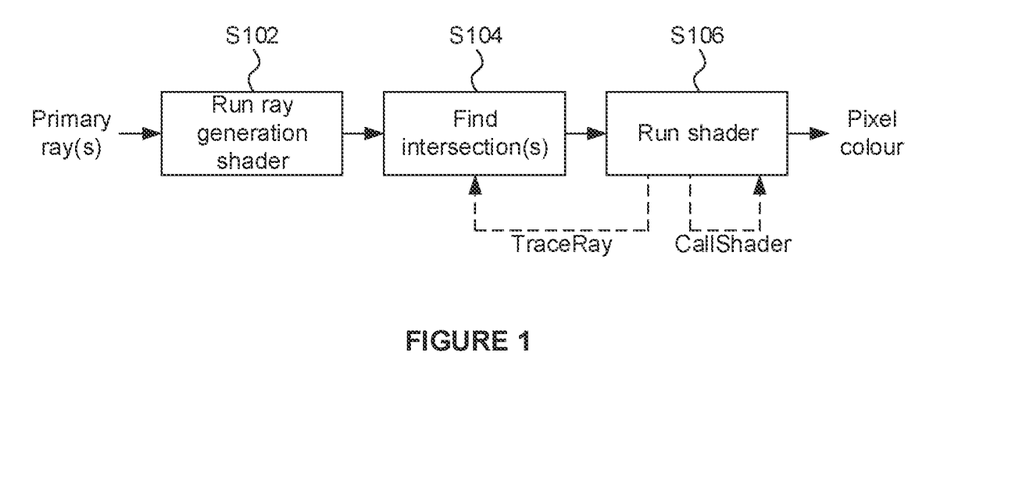
FIG. 1 shows a method of recursively processing rays in a ray tracing system.

Ray tracing is a computational rendering technique for rendering an image of a scene by tracing paths of light ('rays') through the scene, e.g. from a viewpoint from which the image of the scene is being rendered. A ray can be modelled as originating from the viewpoint and passing through a sample position of a rendering space into the scene. Each pixel of the image being rendered may correspond to one or more sample positions of the rendering space. A ray that originates from the viewpoint is referred to as a "primary ray". FIG. 1 shows how rays are processed in a ray tracing system. In step S102, a ray generation shader is executed for one or more primary rays in order to process the ray(s). A "shader" (which may be referred to as a "shader program") is a software module comprising one or more computer-readable instructions which can be executed on a processing unit. The functionality performed by a shader is flexible and is defined by a programmer who writes the code of the shader. As a ray traverses the scene it may intersect one or more objects within the scene. The interaction between a ray and an object it intersects can be modelled to create realistic visual effects. For example, the first shader to be executed for a primary ray (a "ray generation shader") may include an instruction (a "TraceRay" instruction) which causes an intersection testing process to be performed, in step S104, to thereby find one or more intersections of the ray with one or more objects in the scene. The intersection testing process could be performed in hardware or software, but is typically performed in hardware (e.g. using fixed-function circuitry) because efficiency of processing is typically considered to be more important than flexibility in functionality for the intersection testing process. In response to finding an intersection of a ray with an object, in step S106, a shader is executed in respect of the intersection. The shader that is executed (or "run") in step S106 may be a closest hit shader, a miss shader, an intersection shader or an any hit shader, which are defined in the Vulkan and DirectX ray tracing specifications. A programmer writes the shader programs to define how the system reacts to the intersections. The shader that is executed in step S106 may include a TraceRay instruction, which causes one or more further rays (referred to as "secondary rays") to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. Therefore, the method can pass from step S106 back to step S104 as shown by the dashed line in FIG. 1 denoted "TraceRay". When an intersection is found for a secondary ray (in step S104) then another shader can be executed (in step S106). In this way, the method recursively passes between steps S106 and S104 when TraceRay instructions are included in the shaders that are executed in step S106.

A ray is described by data defining the ray origin, ray direction, a maximum culling distance ("Tmax") and a minimum culling distance ("Tmin"). A ray is accompanied by a user defined payload that is modifiable as the ray interacts with geometry in the scene and is visible to the caller of a TraceRay instruction. Furthermore, according to the Vulkan and DirectX ray tracing specifications, the shaders that are executed in step S106 may include one or more "CallShader" instructions, which cause another shader to be executed. Therefore, one shader can call another shader so the method can recursively pass between different shaders as shown by the dashed line in FIG. 1 denoted "CallShader". When all of the shaders for a primary ray have completed then an output for the primary ray is provided. This output may be a rendered value, e.g. pixel colour, which is to be used for the pixel corresponding to the primary ray. In this way, rendered values representing the pixels of the image of the scene are determined.

Vulkan and Direct X are application programming interfaces (APIs) for 3D graphics processing, which have ray tracing extensions defining how programmers can use ray tracing systems to render images of 3D scenes. These APIs have opened up the concept of shader recursion for use in ray tracing systems. As described above, shader recursion occurs when an instruction implemented within a shader causes one or more other shaders to be invoked. The invoked shader (which may be referred to as a "child" shader) is treated like a function call in which control will eventually return back to the invoking shader (which may be referred to as a "parent" shader). Payload data can be passed from a parent shader to a child shader, and the child shader can communicate back to the parent shader by updating the payload data.

When shader recursion is used, some intermediate data for the parent shader is maintained, so the parent shader can continue its execution when the child shader has completed its execution. Many rays may be processed in parallel in a ray tracing system. Furthermore, in order to achieve realistic rendering results, ray tracing systems can allow large recursion depths, e.g. up to a maximum recursion depth of 31. As such, the lifetime of the intermediate data for a parent shader may be very long, and at any given time there may be many shaders for which intermediate data is being maintained.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a method of processing rays in a ray tracing system, the method comprising: allocating a block of memory for a task on a per-task basis; processing rays in the task causing at least one child ray to be emitted; writing intermediate data for the task to said block of memory; suspending processing of the task; and when the task is ready to resume, reading intermediate data for the task from the block of memory, and resuming the processing of the task.

The block of memory may be a contiguous block of memory that has been reserved for storing intermediate data for the task.

The intermediate data for the task may be stored independently of intermediate data generated for any other task.

The task may comprise a plurality of instances of a shader program corresponding to a respective plurality of rays for which the shader program is to be executed.

The intermediate data for the plurality of instances of the task may be written to said allocated block of memory for the task.

The block of memory for the task may be allocated on a per-task basis by performing a single allocation operation, wherein intermediate data for each of the plurality of instances may be written to said block of memory.

The intermediate data may be written to and read from the block of memory in one or more finite-sized data bursts.

The intermediate data for the task may be written to a contiguous region of the block of memory.

The intermediate data for the task may comprise state data that is shared by a plurality of rays of the task.

The intermediate data for the task may comprise task information that is shared by a plurality of rays of the task.

The intermediate data for the task may comprise payload data for each of the rays of the task.

The processing of rays in the task may be performed by processing logic implemented on a chip and the block of memory for the task may be allocated in a memory that is not physically located on the same chip as the processing logic.

Between writing the intermediate data for the task to the block of memory and reading from the block of memory, the intermediate data may be updated in dependence on processing of the at least one child ray.

According to a second aspect of the present invention there is provided a ray tracing system configured to process rays, wherein the ray tracing system comprises: processing logic; and a memory; wherein the processing logic is configured to: allocate a block of memory in the memory for a task on a per-task basis; process rays in the task causing at least one child ray to be emitted; cause intermediate data for the task to be written to said block of memory; suspend processing of the task; and when the task is ready to resume, cause intermediate data for the task to be read from the block of memory, and resume the processing of the task.

The block of memory may be a contiguous block of memory that has been reserved for storing intermediate data for the task.

The intermediate data for the task may be stored independently of intermediate data generated for any other task.

The task may comprise a plurality of instances of a shader program corresponding to a respective plurality of rays for which the shader program is to be executed.

The intermediate data for the plurality of instances of the task may be written to said allocated block of memory for the task.

The block of memory for the task may be allocated on a per-task basis by performing a single allocation operation, wherein intermediate data for each of the plurality of instances may be written to said block of memory.

The intermediate data may be written to and read from the block of memory in one or more finite-sized data bursts.

The intermediate data for the task may be written to a contiguous region of the block of memory.

The processing logic may be implemented on a chip and the memory may not be physically located on the same chip as the processing logic.

Between writing the intermediate data for the task to the block of memory and reading from the block of memory, the intermediate data may be updated in dependence on processing of the at least one child ray.

The ray tracing system may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the system to manufacture a ray tracing system. There may be provided a non-transitory computer readable storage medium having stored thereon a computer readable description of a ray tracing system that, when processed in an integrated circuit manufacturing system, causes the integrated circuit manufacturing system to manufacture an integrated circuit embodying a ray tracing system.

There may be provided an integrated circuit manufacturing system comprising: a non-transitory computer readable storage medium having stored thereon a computer readable description of the ray tracing system; a layout processing system configured to process the computer readable description so as to generate a circuit layout description of an integrated circuit embodying the ray tracing system; and an integrated circuit generation system configured to manufacture the ray tracing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described in the background section above, shader recursion can be used in a ray tracing system, such that a parent shader invokes a child shader. A parent shader invokes a child shader when the parent shader executes a shader recursion instruction. The term "shader recursion instruction" is used herein to refer to any instruction in a shader which invokes another shader. Examples of shader recursion instructions are: (i) "TraceRay" instructions which cause rays to be emitted and cause intersection testing to be performed for the emitted rays, wherein a shader will be executed on the basis of the results of the intersection testing for the emitted ray; and (ii) "CallShader" instructions which directly invoke another shader (with a callable shader type) to be executed without any ray traversal (i.e. intersection testing) being performed. In some implementations an instruction to invoke an 'any-hit' shader may be a shader recursion instruction, e.g. the DirectX ray tracing specification calls these instructions 'ReportHit' instructions, and the Vulkan ray tracing specification calls these instructions 'OpReportIntersectionKHR' instructions. All of these types of shader recursion instructions result in the invocation of a child shader. When a shader recursion instruction is executed as part of a parent shader to thereby invoke a child shader, some intermediate data for the parent shader is maintained, so that the parent shader can be resumed when the child shader has completed its execution.

In examples described herein a shader program is executed for a plurality of rays by executing a task, wherein the task comprises a plurality of instances of the shader program corresponding to a respective plurality of rays for which the shader program is executed. That is, a task comprising a plurality of instances of a shader program corresponding to a respective plurality of rays for which the shader program is to be executed can be generated. For example, a task may be generated by gathering (e.g. collecting) a plurality of instances a shader program corresponding to a respective plurality of rays for which the shader program is to be executed. A task may be executed on a Single Instruction Multiple Data (SIMD) processing unit such that the instructions of the shader program are executed in parallel for each of the instances of the task. Therefore, as described herein, a "task" is a set of instances which are to be executed in parallel; and an "instance" is a collection of data on which a series of operations is to be performed. In examples described herein, the instances of a task correspond to respective rays for which the same series of operations (defined by a shader program) is to be performed.

Rather than writing all of the intermediate data for a parent task (corresponding to a parent shader) to memory (e.g. "dynamic random access memory"—DRAM), it would be possible to keep a parent task in a 'descheduled wait state' on the ray tracing unit whilst all of its child tasks (corresponding to child shaders) and further descendent tasks were executed. When a task is held in a 'descheduled wait state', its intermediate data may be stored in buffers, caches or registers readily accessible to the shader, and/or the shader may remain configured to process that task. However, the whole 'ray-process' operation for processing a primary ray, including executing recursive shaders, is expected to take a significant period of time (may be in the order of 10,000 processing cycles). If this whole process were done while tasks were in 'descheduled wait states', it would be difficult to have enough tasks running in parallel to achieve a target ray traversal performance. In addition to this, each instance in the original task may intersect with a different primitive which wants to launch a different shader program. So, rather than keeping a parent task in a descheduled wait state while its child tasks are executed, when a shader recursion instruction is executed, the intermediate data for the parent task is written to memory (e.g. DRAM memory) and the parent task is suspended (i.e. its execution is temporarily ended on the ray tracing unit). It may be possible to store the intermediate data in on-chip resources (i.e. memory on the chip on which the ray tracing unit is implemented). That said, in these examples, the amount of this on-chip resource may need to be greater than that which is normally implemented in non-recursive ray tracing systems, or the performance of the ray tracing system would be expected to suffer. Therefore, at least some of the intermediate data (e.g. most or all of the intermediate data) may be stored in an off-chip memory. In particular, devices with limited processing resources (e.g. mobile devices) tend to have insufficient on-chip storage capability to store the intermediate data on-chip, so the intermediate data will tend to be stored in off-chip memory. When its child tasks have completed, the intermediate data for the parent task can be read back from memory, and the execution of the parent task can be resumed. When the parent task is resumed the ray tracing unit re-schedules the parent task to carry on with its execution from the point at which it was suspended.

The intermediate data that is stored for a parent task may comprise: (i) state data, (ii) payload data, and (iii) task information.

The state data represents information about the state of the parent task at the point at which its execution is suspended. For example, the state data may include any data stored in temporary registers (which may be per-instance temporary registers or per-task temporary registers) which will need to be accessible when the task resumes. To give some examples, these temporary registers may store intersection indexes and/or barycentrics. As another example, if multiple rays are cast from an associated intersection to model some form of light scattering, whilst the shader is paused, some form of material properties may be held stored as state data for future ray casts associated with the single intersection, e.g. because it may be the case that only one ray is cast at a time. The material properties could, for example, be refractive indexes, opacity, surface normal.

The payload data is per-instance data relating to individual rays being processed. In particular, the payload data comprises application-defined payload objects for the rays. For example, each ray (i.e. each instance) can have an application defined ray payload. A child shader may be able to modify (i.e. update) the payload data provided by a parent shader. The size of a payload depends on the application (typically it's in the order of three or four double words ("dwords"), e.g. to store a pixel colour which has three or four channels with a 32-bit value (e.g. in a floating point format) per channel, but could potentially be larger or smaller than this). The size of the payload data is not fixed.

The task information is intended to store information about which shader program to re-schedule, at what program offset to resume the program, and define which order the original rays were packed into the task. In other words, the task information for a parent task indicates how the execution of the parent task is to be resumed, e.g. specifying the program counter at which the parent shader program is to resume, and specifying information about the mapping between rays and instances of the task (e.g. using ray IDs).

A simple approach to storing the intermediate data for a parent task when its execution is suspended would be to allocate memory on a "per-ray" or "per-instance" basis. That is, intermediate data for each instance would be stored independently of intermediate data for any other instance. In this simple approach, each instance would be allocated a distinct block of memory, e.g. an independent block of memory. The amount of memory to be allocated to each instance would be determined according to a "worst case" storage requirement. The amount of intermediate data (i.e. state data, payload data, and task information) may vary significantly between tasks. If the amount of memory allocated to each instance were to exactly match the amount of intermediate data for that instance, each of the allocated blocks of memory would be sized differently and thus begin at irregularly spaced memory addresses in memory. In this way, the memory would become fragmented overtime. For example, if an instance were to be allocated 12 bytes of memory sandwiched between other memory allocations, and after processing vacate that memory, if the next instance to be allocated memory required 13 bytes of memory it would not be able to use the vacated 12 bytes, and would need to be allocated memory elsewhere. It can be computationally expensive to track, and allocate to, such irregularly spaced vacant regions of memory when the memory becomes fragmented in this way. Thus, a "worst case" storage requirement for an instance is typically determined (e.g. 48 bytes)—and each instance is allocated the same amount of memory according to that "worst case" storage requirement. The worst case storage requirement for an instance can be predetermined. That is, the worst case storage requirement is typically not determined in real-time during the execution of a task. Instead, for example, the worst case storage requirement may be set by a user of a ray-tracing system in dependence on an assumed or pre-calculated worst case storage requirement for an instance based on the graphics data that they intend to process. As each of the allocated blocks of memory are of the same size, they can begin at regularly spaced memory addresses. By allocating the same "worst case" amount of memory to each instance it is significantly less-expensive computationally to keep track of, and allocate to, such regularly spaced blocks of memory. This simple approach can be advantageous in some respects, as each instance can resume processing as soon as its child instance(s) have completed processing—rather than having to wait until all of the child instances associated with all of the other instances within the task have completed processing. In other words, an instance for which the processing of its child instance(s) have completed processing can resume processing regardless of whether one or more other of the instances within the task cause recursion up to, or near to, the maximum recursion depth. However, this simple approach can lead to sparse and inefficient memory usage, as well as larger than necessary storage requirements.

According to examples described herein, memory is allocated for storage of intermediate data on a "per-task" basis. That is, intermediate data for each task is stored independently of intermediate data for any other task. However, the intermediate data for the plurality of instances within a task is stored in the same block of memory. In the examples described herein, the block of memory is a block of continuous memory that has been reserved for storing intermediate data for the task. In the examples described herein, the block of memory is allocated in off-chip memory, i.e. memory not physically located on the same chip as the ray tracing unit. However, it is to be understood that the principles described herein are also applicable to the allocation of memory in on-chip memory (i.e. memory physically located on the same chip as the ray tracing unit).

The amount of memory to be allocated to a task may be determined according to a "worst case" storage requirement. The worst case storage requirement for a task can be predetermined. However, the "worst case" storage requirement for a task may be smaller than the sum of the "worst case" storage requirements for each instance within that task. This is because a number of instances in a task can share some common state data and/or task information. That is, some state data and/or task information may be relevant to all of the instances of the task. Thus, that common state data and/or task information can be stored once within a "per task" block of memory and shared by each of the instances of that task, rather than duplicated across multiple "per instance" blocks of memory—as would be the case in the simple approach described herein. In other words, allocating memory on a "per-task" basis reduces the total amount of memory required to store the intermediate data for each task—as will be described in further detail herein with reference to FIG. 4.

Data is typically written to and read from memory in "bursts". A burst is a finite sized block of data that can be written to, or read from, the memory in a single memory transaction. Data is typically written to and read from memory in an integer number of bursts. For example, a burst may comprise 64-bytes of data. Access to off-chip memory can be most efficient when using "aligned bursts", in which the finite sized block of data to be transferred starts from an offset which is an integer multiple of the finite sized block of data.

As described herein, "per-instance" approaches typically set aside an amount of memory for each instance determined according to a "worst case" storage requirement. In practice, some (e.g. often the majority) of instances do not actually require that much storage. This means that the memory would become sparsely populated. That is, there can be a large amount of empty storage space between "per-instance" data actually stored in memory. As an example, within a block of memory allocated to an instance on a "per-instance" basis, at a given time it may be the case that 10% of that block comprises stored intermediate data, whilst 90% of that block remains empty. Therefore, if intermediate data is allocated to the memory on a "per-instance" basis then there are often gaps between portions of the memory which are storing intermediate data for different instances. Furthermore, it is not unusual for the amount of intermediate data stored for an instance to be less than the burst size for writing and/or reading data to and/or from the memory. For these reasons, the bursts used to read/write data from/to the memory would often be inefficiently used if intermediate data is allocated to the block of memory on a "per-instance" basis. For example, if an instance has 12 bytes of intermediate data, but the worst-case memory allocation for that instance is equal to or more than 64 bytes, then a 64-byte burst used to transfer that intermediate data would only transfer 12-bytes of meaningful data.

When a block of memory is allocated on a "per-task" basis in accordance with the examples described herein, data within that block of memory can be packed more densely. That is, intermediate data for the plurality of instances within the task can be written to contiguous memory locations within the block of memory. In this way, the bursts used to read/write data from/to the memory are more efficiently used. That is, the bursts used to read/write data from/to the memory are more likely to be fully, or nearly fully, packed—as will be described in further detail herein with reference to FIG. 4. Thus, fewer data bursts may be required to read/write intermediate data relating to a task from/to the memory when that intermediate data has been allocated memory on a "per-task" basis in accordance with the examples described herein—than if each instance within that task were to be allocated memory on "per-instance" basis.

As mentioned above, the Vulkan and DirectX ray tracing specifications define different types of shaders, including 'ray generation' shaders, 'closest hit' shaders, 'miss' shaders, 'intersection' shaders and 'any hit' shaders. A ray generation shader is run for a primary ray and may include a shader recursion instruction, e.g. a TraceRay instruction, which invokes one or more further (child) shaders. A closest hit shader is run for the closest committed hit (i.e. the closest intersection) found during the whole ray traversal process. A "hit" is said to occur when a ray intersects the geometry of a triangle. However, the ray may not always interact with the triangle. For example, triangles may have transparent portions. A hit is said to be "committed" when it is determined that the ray interacts with the triangle such that further action may need to be taken. For example, a committed hit occurs when a ray intersects with an opaque triangle, or with a partially or wholly opaque portion of a translucent triangle. So, a closest hit shader will only be run once for a ray.

When the intersection testing module finds an intersection for a ray with an opaque triangle this provides a "committed" hit automatically; whereas when an intersection with a non-opaque primitive is found, an 'any hit' shader is run to determine whether or not to commit the hit. A miss shader is run when the intersection testing for a ray finds no committed hits. An intersection shader is run when the intersection testing module finds an intersection with a "procedural primitive". A procedural primitive may have a complex shape. A procedural primitive may be represented as a bounding volume with a simple geometric shape, such as a box (e.g. an AABB) or a sphere, which bounds the shape of the procedural primitive, so that an intersection testing module can perform intersection testing on the shape of the bounding volume. The application that submits the geometry to the ray tracing system defines the bounding box (or other simple bounding geometric shape) for the procedural primitive. For example, an AABB may be defined by the application with minimum and maximum component values in three dimensions, e.g. in the instance space of the object comprising the procedural primitive. In response to the intersection testing module finding an intersection with a bounding volume for the procedural primitive, the intersection shader is run to determine whether a ray intersects with the shape of the procedural primitive. The intersection testing module may be implemented in fixed-function hardware whereas a shader (e.g. an intersection shader) is implemented in software, so a programmer can define how to find intersections with a procedural primitive having a particular shape by writing a suitable intersection shader, rather than having to define that particular shape of the procedural primitive purely with simple primitive shapes (e.g. triangles) that the intersection testing module is configured to process.

Ray generation shaders, closest hit shaders and miss shaders can include TraceRay instructions. However, 'any hit' shaders and intersection shaders cannot include TraceRay instructions or CallShader instructions.

Memory can be allocated according to the principles described herein for tasks associated with shaders that can invoke one or more further (child) shaders. For example, memory can be allocated according to the principles described herein for tasks associated with ray generation shaders, closest hit shaders and miss shaders. Memory may not be allocated according to the principles described herein for tasks associated with any hit shaders or miss shaders. This is because any hit shaders and miss shaders do not invoke one or more further (child) shaders, so there is no need to suspend processing of tasks associated with these shaders and write the intermediate data for those tasks to memory.

Figure 2:
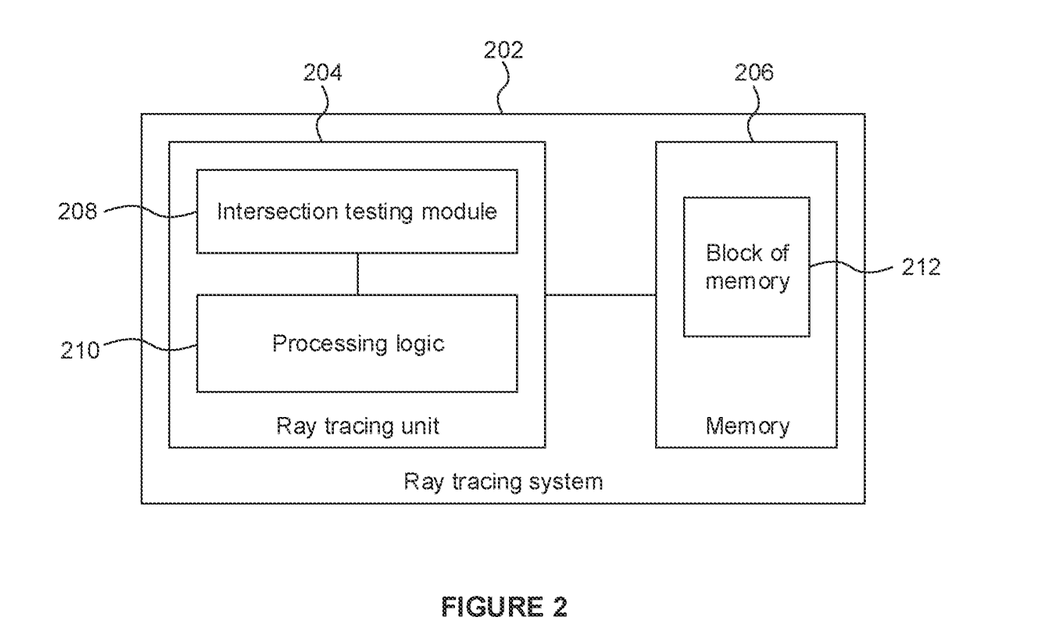
FIG. 2 shows a ray tracing system according to examples described herein.

FIG. 2 illustrates a ray tracing system 202 which comprises a ray tracing unit 204 and a memory 206. For example, the memory 206 may be a dynamic random access memory (DRAM) memory. The ray tracing unit 204 comprises an intersection testing module 208 and processing logic 210. The intersection testing module 208 is configured to perform intersection testing of rays with geometry. The geometry could be associated with nodes of an acceleration structure and may represent regions (e.g. bounding volumes such as axis-aligned bounding boxes (AABBs)) within the scene, or the geometry could be primitives, e.g. triangular primitives, representing surfaces of objects within the scene to be rendered. The intersection testing module 208 may be implemented in hardware, e.g. in fixed-function circuitry, so that it can perform the intersection tests efficiently (e.g. in terms of latency and power consumption). The processing logic 210 is configured to execute computer code, e.g. instructions of shader programs (or other programs). Therefore, the functionality performed by the processing logic 210 is defined by the programs which are executed by the processing logic 210 rather than being defined in the hardware of the processing logic 210. The ray tracing unit 204 may comprise other components which are not shown in FIG. 2, e.g. a module for generating an acceleration structure to represent the objects within the scene. The memory 206 comprises a block of memory 212. The block of memory 212 may be implemented as a block of continuous memory that has been reserved for a particular purpose. The ray tracing unit 204 may be implemented on an integrated circuit. The ray tracing unit 204 may be implemented on a chip and the memory 206 may not be physically located on the same chip as the ray tracing unit and may be referred to as an "external memory" or an "off-chip memory". The memory may also be referred to as "system memory" and it may be used to store data for other processing units in the system, e.g. a Central Processing Unit (CPU). Data passing between the ray tracing unit 204 and the memory 206 travels over a communications bus within the ray tracing system 202. Compared to the speed at which other operations are performed in the ray tracing unit 204, writing data to the memory 206 and reading data from the memory 206 are slow operations which consume relatively large amounts of power. Therefore, it can be beneficial (in terms of reducing the latency and power consumption of the ray tracing system 202) to reduce the amount of data passing between the ray tracing unit 204 and the memory 206. The rate at which data passes between the memory 206 and the ray tracing unit 204 may be referred to as the "memory bandwidth".

Figure 3:
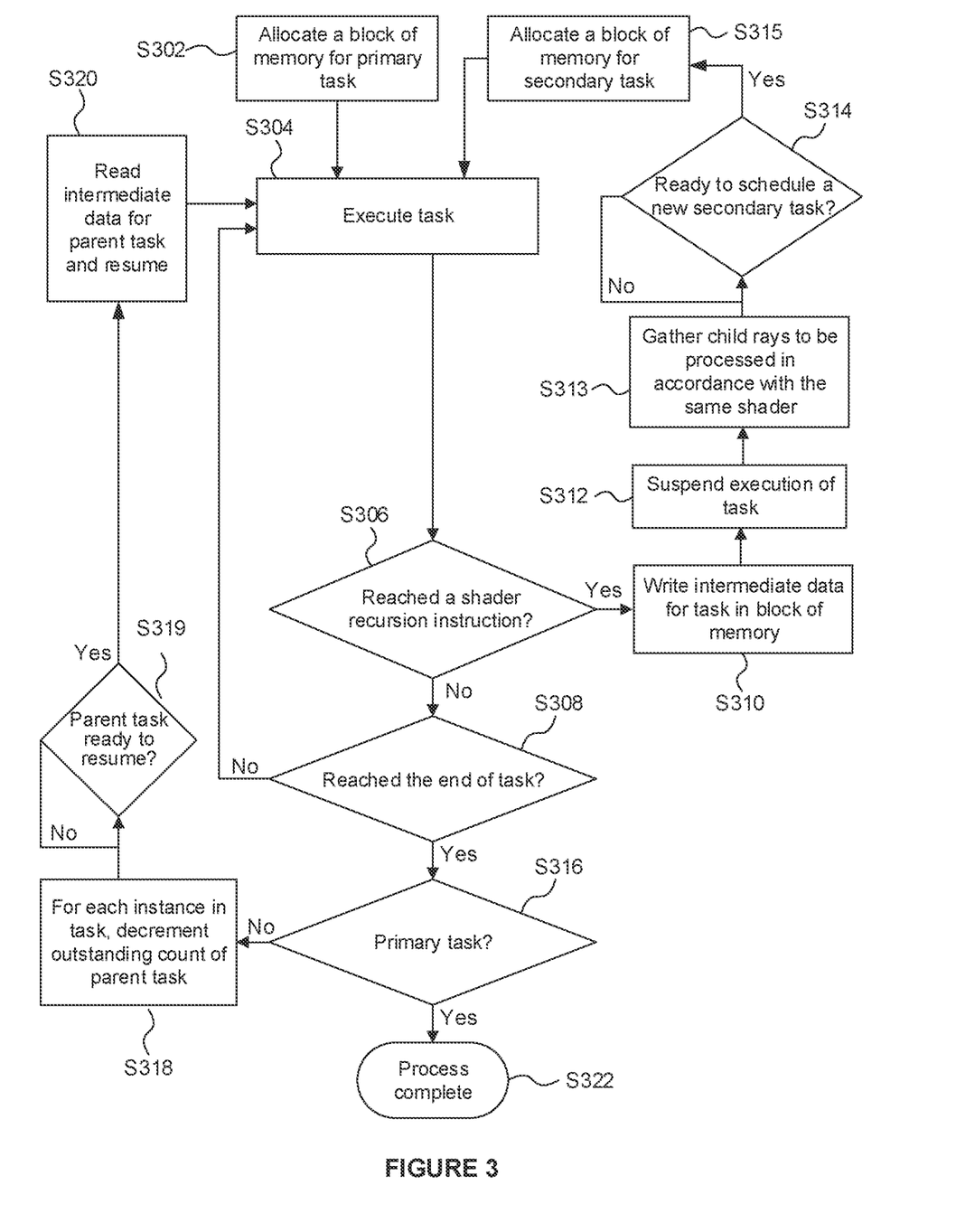
FIG. 3 is a flow chart for a method of recursively processing rays in a ray tracing system according to examples described herein.

FIG. 3 shows a flow chart for a method of processing rays in the ray tracing system 202. In the example described with reference to FIG. 3, multiple rays are processed in parallel by executing tasks which comprise multiple instances of a shader program, wherein each instance corresponds to a ray for which that shader program is to be executed. However, it is noted that in other examples, rays are not necessarily processed in parallel.

In the following paragraphs, FIG. 3 will be described with reference to the processing of an individual primary task. A primary task is a task which does not have a parent task, e.g. a task implementing a ray generation shader is a primary task. However, it is to be appreciated that multiple tasks may be associated with each shader program. For example, there is often an upper limit on the number of instances comprised in a task. A task typically comprises up to a number of instances equal to a power of two—although a task may be partially packed and comprise less than that number of instances. For example, a typical task may comprise up to 128 (i.e. $2^7$) instances. This upper limit on the number of instances in a task may be caused by a hardware restriction (e.g. a limit on how many instances can be processed in parallel on the available processing logic). In this example, if more than 128 rays are to be processed in accordance with the same shader program, then more than one task will be associated with that shader program. For example, if 300 rays are to be processed in accordance with the same shader program, then three tasks may be associated with that shader program (two of which could be fully packed, the third being partially packed). Each task associated with a shader program may be processed in accordance with the same principles as described herein with reference to FIG. 3.

In step 302, a block of memory is allocated to the primary task. In the examples described herein, the block of memory is allocated in off-chip memory (i.e. memory not physically located on the same chip as the ray tracing unit), such as memory 206 in FIG. 2. However, it is to be understood that the principles described herein are also applicable to the allocation of memory in on-chip memory (i.e. memory physically located on the same chip as the ray tracing unit—not shown in FIG. 2).

The primary task may be allocated a unique task identifier. The unique task identifier may provide a mapping (e.g. a direct mapping) to the allocated block of memory. That is, the unique task identifier may be indicative of a memory address, or a range of memory addresses, in memory (e.g. memory 206) where the block of memory allocated to the primary task can be found.

In step S302, memory is allocated to the primary task for storage of intermediate data on a "per-task" basis. That is, a block of memory is allocated such that the intermediate data that will be generated during the execution of two or more instances of the primary task can be stored in the same block of memory. In other words, a block of memory for the primary task is allocated on a per-task basis by performing a single allocation operation. Intermediate data for each of the plurality of instances comprised by the primary task can be written to said allocated block of memory. This is in contrast to allocating memory on a "per-ray" or "per-instance" basis, where separate memory allocation operations would be performed for each instance comprised within the primary task—such that multiple memory allocation operations would be performed for the primary task. Memory is allocated in step S302 such that intermediate data for the primary task is stored independently of intermediate data for any other task.

Figure 4:
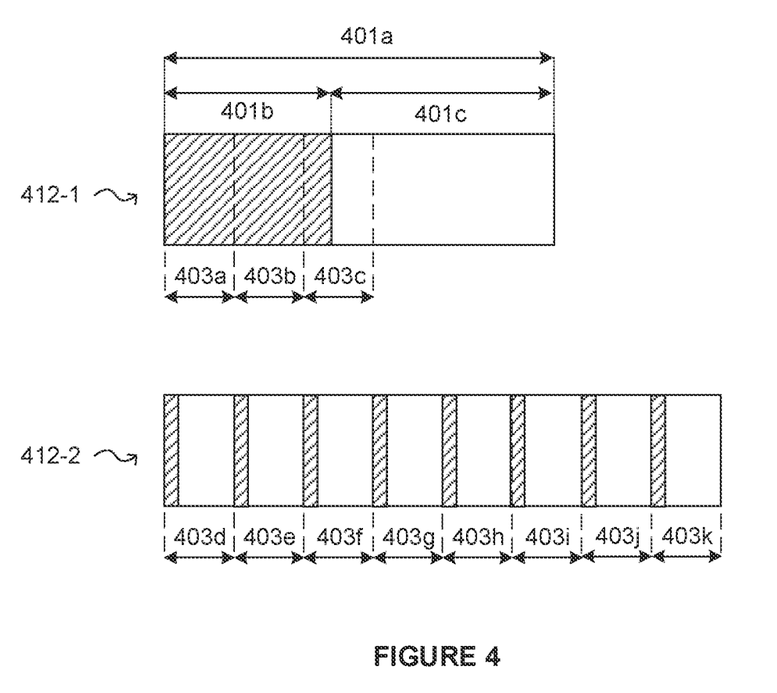
FIG. 4 compares per-task and per-instance memory allocations for the same task.

Two advantages of allocating memory for storage of intermediate data on a "per-task" basis can be understood with reference to FIG. 4, which compares per-task and per-instance memory allocations for the same task. FIG. 4 considers the allocation of memory to one task comprising eight instances. Such a task is provided by way of example only. As described herein a task typically comprises up to a number of instances equal to a power of two—although a task may be partially packed and comprise less than that number of instances. For example, a typical task may comprise up to 32 (i.e. $2^6$) instances, 64 (i.e. $2^6$) instances, or 128 (i.e. $2^7$) instances.

In FIG. 4, a per-task memory allocation of a block of memory according to examples described herein is shown at 412-1. This is schematically compared to a set of eight blocks of memory allocated in eight per-instance memory allocations for the eight instances in that task, shown at 412-2.

Considering 412-1, as described herein, the amount of memory to be allocated to a task may be determined according to a "worst case" storage requirement. The amount of memory allocated may be referred to as the size of the block of memory. The amount of memory allocated to the task in FIG. 4 is shown as 401a. In practice, some (e.g. often the majority) of tasks do not actually require the "worst case" storage requirement. Thus, in the example shown at 412-1 in FIG. 4, the amount of the allocated block of memory that is actually used to store intermediate data is shown by the hatched region 401b, whilst region 401c shows the amount of the allocated block of memory that remains empty.

Considering 412-2, as described herein, the amount of memory to be allocated to each instance may be determined according to a "worst case" storage requirement. As the task comprises eight instances, 412-2 shows eight blocks of memory allocated to those eight instances respectively. In the example shown at 412-2 in FIG. 4, each block of memory includes a hatched region showing the amount of the allocated block of memory that is actually used to store intermediate data, and a non-hatched region showing the amount of the allocated block of memory that remains empty.

As shown in FIG. 4, the size of the block of memory allocated on a per-task basis, shown at 412-1, is smaller than the total size of the eight blocks of memory allocated to the eight instances of that task, as shown at 412-2. This is because a number of instances in the task are likely to share some common state data and/or task information. That is, some state data and/or task information may be relevant to all of the instances of the task. Thus, that common state data and/or task information can be stored once within a "per task" block of memory and shared by each of the instances of that task, as in 412-1, rather than duplicated across multiple "per instance" blocks of memory, as in 412-2. In other words, allocating memory on a "per-task" basis reduces the total amount of memory required to store the intermediate data for each task. In this way, the overall memory requirements (e.g. the memory footprint) of the ray tracing system can be reduced.

As described herein, data is typically written to and read from memory in "data bursts", such as DRAM bursts. A burst is a finite sized block of data that can be written to, or read from, the memory in a single memory transaction. For example, a data burst may comprise 64-bytes of data. Data is typically written to and read from memory in an integer number of bursts. By way of example, the boundaries of several finite-sized data bursts 403a-k are shown in FIG. 4, overlaid on blocks of memory 412-1 and 412-2. In FIG. 4, for simplicity, the size of each data burst is equal to the size of each block of memory allocated on a per-instance basis. This is by way of example only. Often, there is no fixed relationship between the size of a data bursts and the size of a block of memory allocated on a per-instance basis.

When a block of memory is allocated on a "per-task" basis in accordance with the examples described herein, data within that block of memory can be packed more densely, as shown at 412-1, compared to when multiple blocks of memory are allocated on a "per-instance" basis, as shown at 412-2. That is, intermediate data for the plurality of instances within the task can be written to contiguous memory locations within the block of memory—as shown at 401b. For this reason, the data bursts used to write data to the memory can be more efficiently used. That is, the data bursts used to write data to the memory are more likely to be fully, or nearly fully, packed. For example, as shown in FIG. 4, all of the intermediate data stored in the block of memory 412-1 could be written to the memory using three data bursts 403a, 403b and 403c. Data bursts 403a and 403b are fully packed, whilst data burst 403c is partially packed. That is, a portion of the data burst 403c carries a portion of stored intermediate data 401b (shown using hatching), whilst the remaining portion of the data burst carries no meaningful data. As the region of memory 401c comprises no intermediate data, no further data bursts need to be used to write intermediate data for the task to the memory.

By contrast, when blocks of memory are allocated on a "per-instance" basis, the memory itself becomes sparsely populated—as shown at 412-2. As shown in FIG. 4, eight data bursts 403d-k would be needed to write the intermediate data for each of the eight instances of the task to the memory. None of those eight data bursts 403d-k are fully packed. That is, all eight data bursts 403d-k are partially packed. In other words, each data burst is being used inefficiently.

As shown in FIG. 4, fewer data bursts may be needed to write intermediate data relating to a task to the memory when that intermediate data has been allocated memory on a "per-task" basis in accordance with the examples described herein—rather than if each instance within that task were to be allocated memory on a "per-instance" basis. As fewer data bursts are required, this means that the time taken, and/or latency associated with, transferring intermediate data to the memory can be reduced by allocating memory on a "per-task" basis. Although not discussed in detail in the preceding paragraphs, equivalent advantages are realised when reading intermediate data from the memory when that intermediate data has been allocated memory on a "per-task" basis in accordance with the examples described herein.

Although the allocation of memory to a single task has been described herein with reference to FIG. 3, it is to be understood that memory can be allocated to multiple tasks according to the same principles. In some examples, processing logic 210 may allocate a "heap" of memory for multiple tasks (e.g. several thousand tasks), which is subsequently sub-divided (e.g. in memory hardware) into multiple blocks of memory—one block of memory for each task. For example, the processing logic may define a base memory address for the heap of memory, and a "stride" that defines the size of each block of memory. The stride can be used to determine where each block of memory within the heap is to "start". For example, the first block of memory in the heap may start (e.g. have its first memory address located at) at the base memory address. The first memory address of each subsequent block of memory may be offset from the first memory address of its preceding block of memory by the stride. As such, a task may be allocated a unique integer index, which when multiplied by the stride calculates an offset relative to the base memory address to a block of memory for the task.

It is to be understood that memory need not be allocated prior to executing the task, as shown in FIG. 3. Instead, memory may be allocated in accordance with the principles described herein at any suitable time. For example, memory may be allocated immediately prior to writing intermediate data for that task to memory (e.g. between steps S306 and S310—which will be discussed in further detail herein).

Returning to FIG. 3, in step S304 instructions of the primary task are executed on the processing logic 210. In particular, on this first iteration, the primary task is executed for a plurality of rays. In this example, the primary task includes at least one instance that includes a shader recursion instruction which invokes a child shader. For example, the processing of an instance of the primary task may cause at least one child ray to be emitted. As described above, two examples of shader recursion instructions are TraceRay instructions and CallShader instructions.

In step S306 the processing logic 210 determines whether the execution of any of the instances of the primary task has reached a recursion instruction. If not, then the method passes to step S308 in which the processing logic 210 determines whether the execution of the task has reached the end of the shader program, i.e. whether there are no more instructions of the task still to execute. If not (i.e. if there are still more instructions of the primary task to execute) then the method passes back to step S304 and the execution of the instructions of the primary task continues.

When the primary task reaches a shader recursion instruction, the method passes from step S306 to step S310. In step S310, intermediate data for the primary task is written to the allocated block of memory. The block of memory 212 is used to retain the intermediate data for the primary task and to potentially have part of it (e.g. the stored payload data) updated by a child shader associated with child rays emitted by the primary task. The block of memory 212 is used by the primary task to hold information (i.e. state data, task information and payload data) for use past the shader recursion instruction which was reached in step S306. Since the primary task has been suspended (i.e. ended on the processing logic 210), the current state of the primary task (including state data, task information and payload data) is retained, so when the primary task resumes (as described in further detail below), that state of the primary task can be restored such that the execution of the primary task can be resumed.

In step S312 the execution of the primary task for the plurality of rays is suspended, i.e. temporarily ended. In this way, the execution of the primary task is suspended in response to the shader recursion instruction. In some cases (e.g. if the shader recursion instruction is a TraceRay instruction), at least one child ray may be emitted. Also, in step 312, a counter may be initialised for the primary task that is used to keep track of how many child rays emitted by that task are yet to have completed processing. For example, the counter may be incremented once for each child ray emitted by the primary task which is yet to have completed processing.

After the execution of the primary task is suspended in step S312, the method passes to step S313. In step S313, a plurality of child rays that are to be processed in accordance with the same child shader program are gathered so as to form a secondary task. A secondary task is a task which has a parent task (e.g. in this iteration, the parent task is the primary task). A secondary task is a task that comprises a plurality of instances of a child shader program corresponding to a respective plurality of child rays for which that child shader program is to be executed. Each of the plurality of child instances in a secondary task may correspond to child rays emitted from the same parent task (e.g. the primary task). This can occur when a plurality of rays associated with the primary task interact with the same object. Alternatively, the secondary task may comprise a plurality of child instances corresponding to child rays emitted from two or more different parent tasks (e.g. the primary task and one or more other tasks).

In step S314, the processing logic 210 determines whether a new secondary task is ready to be scheduled. This can occur, for example, when no further instances are to be added to a task, but different systems will use different criteria for determining when to schedule a task.

After it has been determined that the new secondary task is ready to be scheduled in step S314, the method passes to step S315, where a block of memory is allocated for the secondary task. The block of memory is allocated in accordance with the principles described herein (e.g. as described with reference to step S302).

In step S304 instructions of the secondary task are executed on the processing logic 210. As described above, the shader recursion instruction indicates payload data for each ray to be processed in accordance with the secondary task. The execution of the secondary task in step S304 may update said indicated payload data in the block of memory 212 allocated to the primary task.

The method proceeds for the secondary task from step S304 in the same manner as described above for the primary task. If the secondary task includes at least one instance that invokes a shader recursion instruction then the loop around steps S310 to S315 may be performed again, such that a further secondary task (e.g. a task having the secondary task as its parent task) is invoked by one or more of the plurality of instances of the secondary task. Each instance of the primary task may continue recursing up to a maximum recursion depth at which point any further recursion is prevented (not shown in FIG. 3). The API may define the maximum recursion depth. For example, the maximum recursion depth may be 31.

At some point, the method will perform step S308 for a secondary task and it will be determined that the end of that secondary task has been reached, such that the 'yes' route is taken from step S308. The payload that was provided to that secondary task from its parent task (e.g. the primary task, or an earlier secondary task from a previous iteration of steps S310 to S315) may have been modified by the execution of that secondary task or by the execution of any tasks which are the descendants of the secondary task.

The method then passes to step S316 in which it is determined whether the task is the primary task. In other words, it is determined whether the primary task (i.e. the original parent task, e.g. implementing a ray generation shader) is currently active. In this iteration, the task is a secondary task and so the method passes to S318.

In step S318, for each instance in the secondary task that has completed processing the counter initialised in step S310 for its parent task(s) are decremented (as described herein, a secondary task may comprise instances associated with one or more parent tasks). If an instance from the secondary task that has completed processing causes the counter for one or more of the secondary task's parent tasks to be decremented to 0 (e.g. indicating that all of the child rays emitted by that parent task have completed processing), this indicates in step S319 that that parent task is ready to resume.

In step S320 the processing logic 210 reads intermediate data for the parent task to be resumed. For example, one or more of the state data, task information and payload data for the parent task may be read from the block of memory allocated to that task. The method can then pass back to step S304 in order to execute more instructions of the parent task, i.e. instructions of the parent task after the shader recursion instructions which caused one or more child rays to be emitted. In this way, the execution of the parent task is resumed. The task information for the parent task is used so that the processing logic 210 can determine the program counter of the next instruction of the parent shader program that is to be executed (which will correspond to the next instruction in the parent shader program after the shader recursion instruction which caused one or more child rays to be emitted). For example, the task information may first be read from memory in order to resume the parent task. Once the task has been resumed, the state data may be read from memory so as to configure the ray tracing unit for processing the task. During execution of the task in step S304, the payload data for the task may be read from memory for processing by the shader.

The method can then proceed as described above from step S304. When the method gets to step S316 and the task is determined to be the primary task (i.e. the original parent task is active) then, as indicated in step S322, the processing for the primary task is complete. At this point the ray tracing system 202 may have determined a rendered value for a plurality of sample positions in the rendering space, which may, for example, be pixel colour values for pixels of the image being rendered. The ray tracing system can process further rays until all of the pixel values of the image being rendered have been determined.

Figure 5:
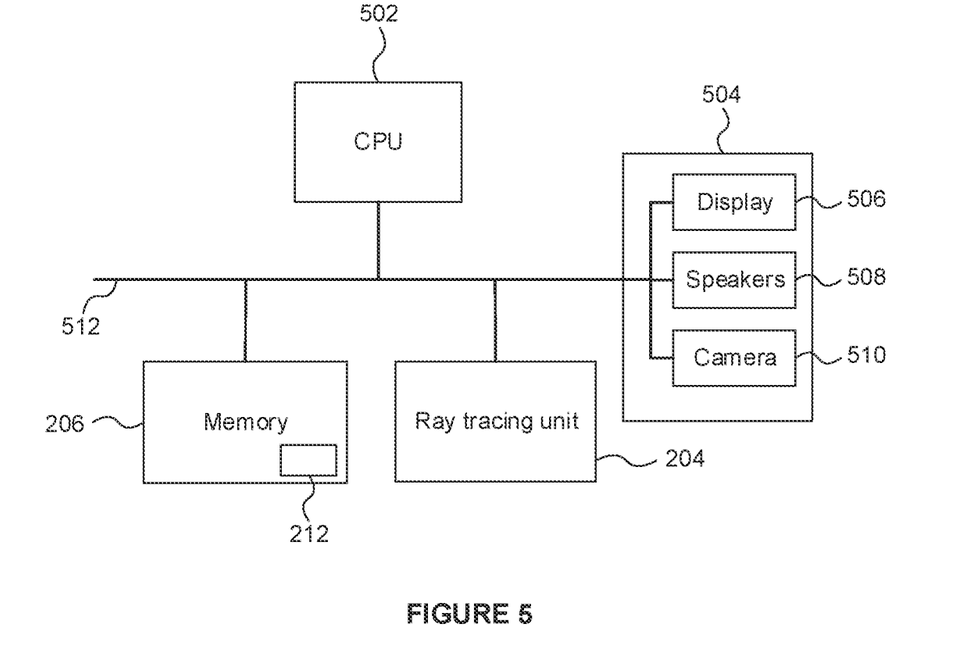
FIG. 5 shows a computer system in which a ray tracing system is implemented.

FIG. 5 shows a computer system in which the ray tracing systems described herein may be implemented. The computer system comprises a CPU 502, the memory 206, the ray tracing unit 204 and other devices 504, such as a display 506, speakers 508 and a camera 510. The memory 206 comprises the block of memory 212. The components of the computer system can communicate with each other via a communications bus 512.

The ray tracing system 202 of FIG. 2 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 6.

Figure 6:
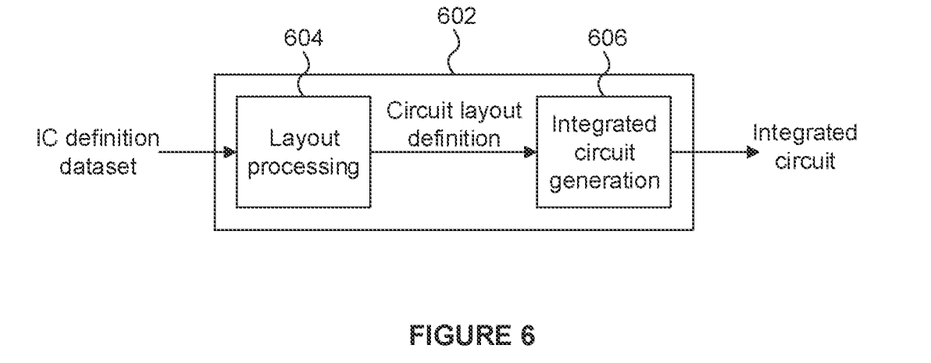
FIG. 6 shows an integrated circuit manufacturing system for generating an integrated circuit embodying a ray tracing system.

FIG. 6 shows an example of an integrated circuit (IC) manufacturing system 602 which is configured to manufacture a ray tracing system as described in any of the examples herein. In particular, the IC manufacturing system 602 comprises a layout processing system 604 and an integrated circuit generation system 606. The IC manufacturing system 602 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 602 to manufacture an integrated circuit embodying a ray tracing system as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing rays in a ray tracing system, the method comprising:
   allocating a block of memory for a task on a per-task basis, wherein the task comprises a plurality of instances of a shader program corresponding to a respective plurality of rays for which the shader program is to be executed;
   processing the rays in the task causing at least one child ray to be emitted;
   writing intermediate data for the task to said block of memory;
   suspending processing of the task; and
   when the task is ready to resume, reading the intermediate data or updated intermediate data for the task from said block of memory, and resuming the processing of the task.

2. The method of claim 1, wherein the block of memory is a contiguous block of memory that has been reserved for storing intermediate data for the task.

3. The method of claim 2, wherein the intermediate data for the task is stored independently of intermediate data generated for any other task.

4. The method of claim 1, wherein the intermediate data for the plurality of instances of the task is written to said allocated block of memory for the task.

5. The method of claim 1, wherein the block of memory for the task is allocated on a per-task basis by performing a single allocation operation, wherein intermediate data for each of the plurality of instances is written to said block of memory.

6. The method of claim 1, wherein the intermediate data is written to and read from the block of memory in one or more finite-sized data bursts.

7. The method of claim 1, wherein the intermediate data for the task is written to a contiguous region of the block of memory.

8. The method of claim 1, wherein the intermediate data for the task comprises state data and/or task information that is shared by a plurality of rays of the task.

9. The method of claim 1, wherein the intermediate data for the task comprises payload data for each of the rays of the task.

10. The method of claim 1, wherein the processing of rays in the task is performed by processing logic implemented on a chip and the block of memory for the task is allocated in a memory that is not physically located on the same chip as the processing logic.

11. The method of claim 1, wherein between writing the intermediate data for the task to the block of memory and reading from the block of memory, the intermediate data is updated in dependence on processing of the at least one child ray.

12. The method of claim 1, wherein:
   reading intermediate data for the task from said block of memory comprises reading, from said block of memory, the intermediate data for the task that was written to said block of memory; or
   the intermediate data for the task that was written to said block of memory is updated, and reading intermediate data for the task from said block of memory comprises reading, from said block of memory, the updated intermediate data for the task.

13. A ray tracing system configured to process rays, wherein the ray tracing system comprises:
   processing logic embodied in hardware on an integrated circuit; and
   a memory;
   wherein the processing logic is configured to:
      allocate a block of memory in the memory for a task on a per-task basis, wherein the task comprises a plurality of instances of a shader program corresponding to a respective plurality of rays for which the shader program is to be executed;

process the rays in the task causing at least one child ray to be emitted;

cause intermediate data for the task to be written to said block of memory;

suspend processing of the task; and when the task is ready to resume, cause the intermediate data or updated intermediate data for the task to be read from said block of memory, and resume the processing of the task.

14. The ray tracing system of claim 13, wherein the block of memory is a contiguous block of memory that has been reserved for storing intermediate data for the task.

15. The ray tracing system of claim 14, wherein the intermediate data for the task is stored independently of intermediate data generated for any other task.

16. The ray tracing system of claim 13, wherein the intermediate data for the plurality of instances of the task is written to said allocated block of memory for the task.

17. The ray tracing system of claim 13, wherein the block of memory for the task is allocated on a per-task basis by performing a single allocation operation, wherein intermediate data for each of the plurality of instances is written to said block of memory.

18. The ray tracing system of claim 13, wherein the processing logic is implemented on a chip and the memory is not physically located on the same chip as the processing logic.

19. A non-transitory computer readable storage medium having stored thereon computer readable instructions that, when executed at a computer system, cause the computer system to perform a method of processing rays in a ray tracing system, the method comprising:

allocating a block of memory for a task on a per-task basis, wherein the task comprises a plurality of instances of a shader program corresponding to a respective plurality of rays for which the shader program is to be execute;

processing the rays in the task causing at least one child ray to be emitted;

writing intermediate data for the task to said block of memory;

suspending processing of the task; and when the task is ready to resume, reading the intermediate data or updated intermediate data for the task from said block of memory, and resuming the processing of the task.

* * * * *